Figure 1:
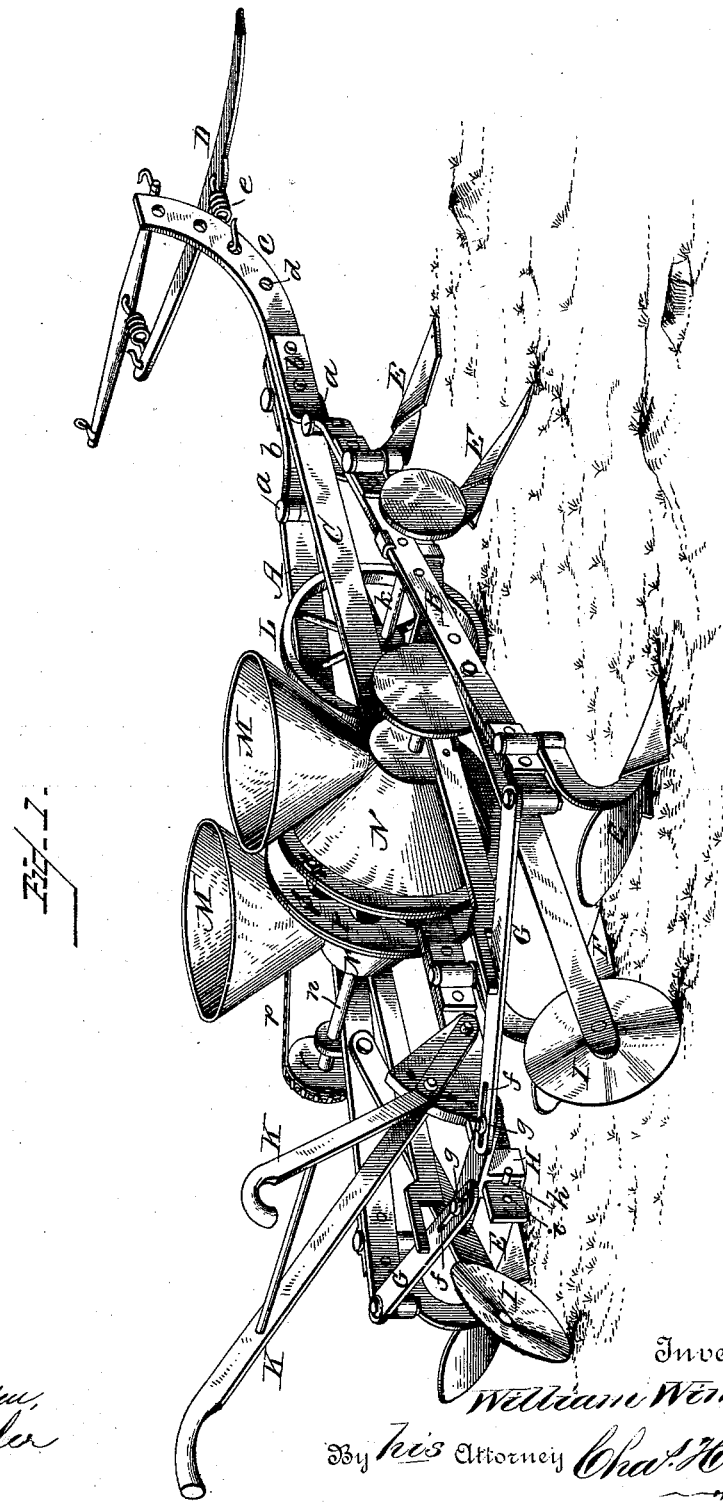

(No Model.) 2 Sheets—Sheet 1.

W. WIMPEE.
CULTIVATOR, COTTON PLANTER, AND FERTILIZER DISTRIBUTER.

No. 347,545. Patented Aug. 17, 1886.

Witnesses

Inventor
William Wimpee.
By his Attorney Chas. H. Fowler (No Model.) 2 Sheets—Sheet 2.
W. WIMPEE.
CULTIVATOR, COTTON PLANTER, AND FERTILIZER DISTRIBUTER.
No. 347,545. Patented Aug. 17, 1886.
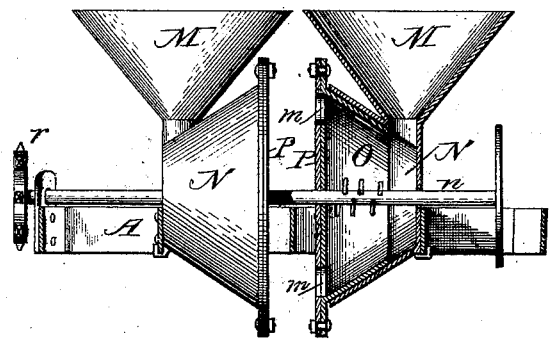
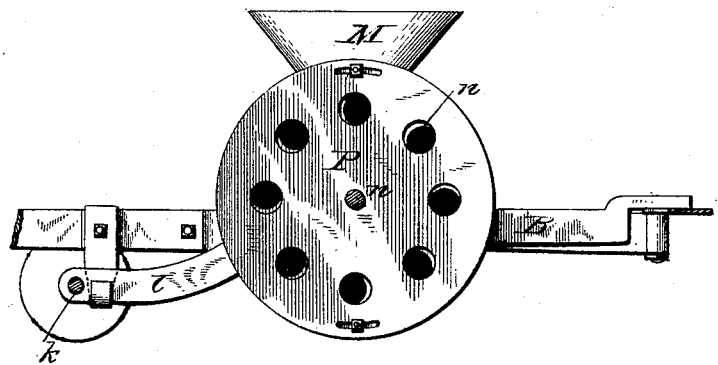

UNITED STATES PATENT OFFICE.

WILLIAM WIMPEE, OF ROME, GEORGIA.

CULTIVATOR, COTTON-PLANTER, AND FERTILIZER-DISTRIBUTER.

SPECIFICATION forming part of Letters Patent No. 347,545, dated August 17, 1886.

Application filed April 15, 1886. Serial No. 198,887. (No model.)

*To all whom it may concern:*

Be it known that I, WILLIAM WIMPEE, a citizen of the United States, residing at Rome, in the county of Floyd and State of Georgia, have invented certain new and useful Improvements in Cultivator, Cotton-Planter, and Fertilizer-Distributer; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an end view, on an enlarged scale, of the hoppers, showing one of the discharge-chambers in section; and Fig. 3, an inner side view of one of the hoppers and supporting-frame.

The present invention has for its object to provide a simple and effective device that can be used as a cultivator, cotton-planter, and fertilizer-distributer, and provide means whereby these several results may be successively performed, which objects I attain by the construction substantially as shown in the drawings, and hereinafter described and claimed.

In the accompanying drawings, the frame of the machine consists of the beams A B, which form the sides thereof and are hinged at their forward ends, as shown at $a$, to angle-plates $b$, secured to the sides of a central draft-bar, C, curved upwardly at its front end, as shown at $c$, and provided with a series of perforations, $d$, for adjustably connecting thereto a spring-clevis, $e$, of a whiffletree, D, whereby its height may be regulated with relation to the frame of the machine, as circumstances require.

The side beams, A B, have detachably connected to them in any well-known manner a series of plows, E, one or more plows being in like manner connected to the rear end of the draft-bar C, as shown at F.

I do not desire to confine myself to any particular form, shape, or construction of the plows, as they may be variously modified to adapt them for certain classes of work, and their number may be increased or diminished as circumstances require.

To the rear ends of the beams A B are pivoted the ends of braces G, the inner ends thereof having slots $f$, and are connected to a bracket, H, by set-screws $g$, or other convenient means. This bracket slides on the rear end of the draft-bar C, and is held in its adjusted position by a pin, $h$, entering one of a series of perforations, $i$, in the draft-bar. By this means the beams A B may be brought nearer together or farther apart to decrease or increase the width of the frame, the hinging of the beams at their forward end and the slotted braces allowing of this adjustment of the frame.

Suitable coverers, I, may be employed in the rear of the plows, so as to cover the seed as it is planted, any number being used, as found necessary.

To the draft-bar C are suitably attached handles K, and the driving-wheel L is rigidly secured to the axle $k$, which has its bearings in suitable boxes attached to the frame of the machine or hangers $l$, as shown in Fig. 3.

The hoppers M are each provided with a flaring discharge-chamber, N, at one side thereof, and fitting within this chamber is an apron, O, of corresponding shape and formed with discharge-openings $m$. These discharge-openings are regulated by a gage-plate, P, adjustably connected to the outer side of the apron O, whereby the discharge of the contents of the chambers is controlled, the particular form or shape of the chambers more effectually feeding the cotton-seed or fertilizer to the discharge-openings. One of these hoppers, with its discharge-chamber and gage-plate, is to be used for cotton-seed and the other for fertilizer, and the shaft $n$, through which it passes, may be provided with the usual agitators or stirrers.

Any desirable means may be employed for operating the shaft $n$ by its connection with the axle $k$ of the driving-wheel L. As one of the means for attaining this end, I have shown a sprocket-chain, $p$, engaging with sprocket-wheel $r$, one on the end of the shaft $n$ and the other on the end of the axle. The opposite ends of the shaft and axle may in like manner be connected, or by suitable gearing, belt, and pulleys, or a lazy-tongs may be used, as I do not wish to be understood as confining my invention to any particular means of imparting motion to the shaft which passes through the discharge-chambers of the hoppers, as any well-known arrangement of devices or driving mechanism may be employed without departing from the principle of my invention.

Having now fully described my invention, what I claim as new, and desire to secure by Letters Patent, is—

In a combined cultivator, cotton-planter, and fertilizer-distributer, an expansible frame provided with suitable plows and coverers, in combination with hoppers having flaring discharge-chambers, correspondingly-formed aprons fitting therein and having discharge-openings, and a gage-plate adjustably connected thereto, the agitator-shaft of the hoppers being operated through suitable mechanism connected with the driving-axle, substantially as and for the purpose specified.

In testimony that I claim the above I have hereunto subscribed my name in the presence of two witnesses.

WILLIAM WIMPEE.

Witnesses:
E. J. MAGRUDER,
F. S. HILLS.